Nov. 4, 1924.
J. F. WRIGHT
1,514,118
OIL TREATING MACHINE
Filed April 9, 1923
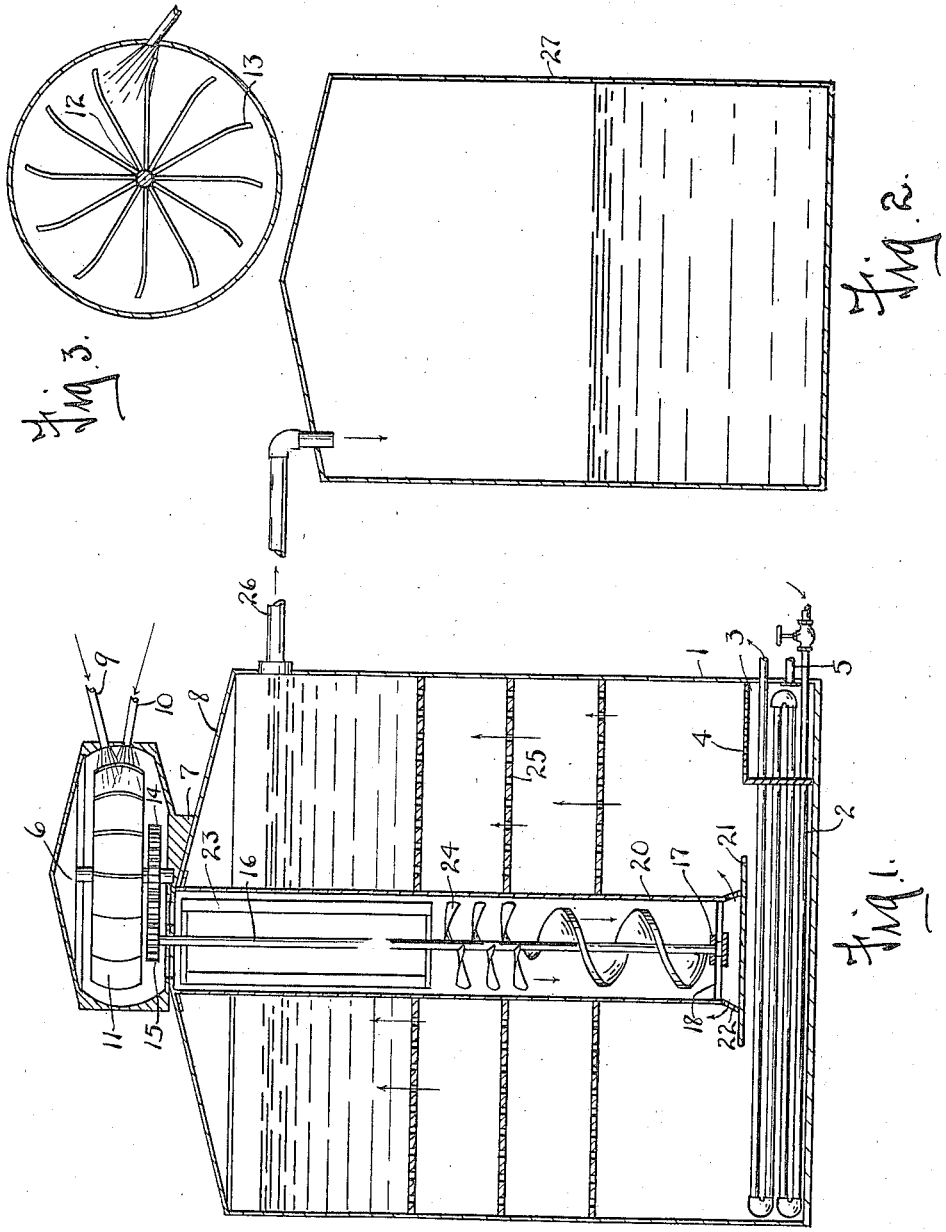
JOHN F. WRIGHT, Inventor
By Jesse R. Stone
his Attorney Patented Nov. 4, 1924.

1,514,118

UNITED STATES PATENT OFFICE.

JOHN F. WRIGHT, OF EL DORADO, ARKANSAS.

OIL-TREATING MACHINE.

Application filed April 9, 1923. Serial No. 631,028.

*To all whom it may concern:*

Be it known that I, JOHN F. WRIGHT, a citizen of the United States, residing at El Dorado, Union County, Arkansas, have invented a certain new and useful Improvement in Oil-Treating Machines, of which the following is a full, clear, and exact description, such as will enable others skilled in the art to which it appertains to make and use the same.

My invention relates to machines for treating impure crude oil to eliminate objectionable matter therefrom.

In many wells the petroleum coming from the well is mixed with basic sediment and water. This mixture is composed of very fine particles held in suspension in the oil in such manner that it will not readily settle out.

It is an object of my invention to provide a device by means of which the emulsion of water and basic sediment can be separated from the oil without the use of chemicals.

Another object is to expedite the separation of the oil and water by agitation and heat under reduced pressure whereby the process may be made continuous. I further aim to make a simple and strong construction easily assembled and economically operated.

The oil is now separated from the emulsion of water and sediment by various methods, most of which are costly and which involve long and tedious treatment. Electrical dehydration; saponifying and heating the mixture; centrifugal action and various other methods are used. I desire, however, to separate the oil from the emulsion in a more simple and continuous process which causes no deterioration in the quality of the oil.

Referring to the drawing herewith wherein a preferred embodiment of my invention is disclosed. Fig. 1 is a central longitudinal section through an installation employing my invention; Fig. 2 is a storage tank and Fig. 3 is a transverse section through my propeller wheel. Like numerals of reference are employed to designate like parts in all the views.

In carrying out my invention I employ a large treating tank 1 having in the bottom of the same a series of steam coils 2 tending to heat the contents of the tank. At one side of the bottom is a chamber 3 boxed off from the rest of the tank but having a perforated top 4. This forms a super-heater from which water is drawn to mix with the oil to be treated through an outlet pipe 5. The steam pipes passing through this chamber maintain the water therein at high temperature.

The oil to be treated, I desire to thoroughly mix in atomized form with a spray of hot water. I do this by spraying the oil with hot water drawn from the pipe 5 into a closed chamber 6, mounted at 7 on the arched upper end 8 of the tank. The two liquids are pumped in under pressure through two inclined nozzles 9 and 10.

Within the chamber is a propeller wheel 11 mounted on a vertical stub shaft 12 having bearings in the frame work of the housing. The blades or vanes 13 of the propeller are radial but have their outer ends curved rearwardly so as to better receive the impulse of the jets of liquid from the spray nozzles, thus causing the rotation of the propeller.

On the shaft 12 below the propeller is a crown gear wheel 14, positioned to mesh with a smaller gear 15, upon a shaft 16 extending downwardly into the treating tank and having a bearing at 17, in a spider 18 at the lower end of a cylindrical tube or agitating pipe 20. This tube is secured to the upper end 8 of the tank and extends to a point immediately above the steam coils 2. The lower end is open and the fluid discharged downwardly will strike a horizontal baffle 21 below the outlet and secured to the tube by connecting strips 22.

Mounted upon the shaft 16 are a series of agitating members comprising longitudinal paddles or blades 23 at the upper end. Below these blades are radial agitating vanes 24 curved to impart a downward drive upon the liquid. Below these blades is a spiral or screw blade, also adapted to impart a downward motion to the liquid during rotation of the shaft.

Within the tank and fitting about the tube 20 are a plurality of horizontal perforated baffles 25 to assist in the separating of the water from the oil.

In the operation of the device, oil and hot water are sprayed under pressure against the blades of the propeller 11. The nozzles are inclined so that the sprays will be intimately mixed and the oil acted upon by the hot water. The mixture of oil and water will be drawn down into the tube to where it will be further agitated and broken up by the blades and driven forcibly downward by the blades 24 and 23. This will act to exhaust more liquid than enters the housing or chamber 6 through the spray nozzles. This causes a decrease in pressure in said chamber due to the strong downward draft or suction. This fact overcomes the surface tension of the liquids and, together with the heat of the water tends to settle out the water and basic sediment.

The mixture issues from the tube 20 against the plate 21 and is deflected up away from the steam pipes and through the perforations in the baffles 25. This serves to retard the flow and breaks up the bubbles which may form and allows the water and sediment to settle out.

The oil which rises to the top will be free of emulsion and may be drawn off through an outlet pipe 26 to a storage tank 27.

It will be noted that this process can be made continuous, it being only necessary to clear the treating tank of settlings at intervals. The employment of the partial vacuum automatically produced in the operation of the machines makes the process rapid and effective.

Having thus described my invention, what I claim as new and desire to protect by Letters Patent is:

1. An oil treating device comprising a tank, a housing thereon, a propeller blade in said housing, converging nozzles positioned to deliver oil and hot water simultaneously against the blades of said propeller, agitating means for said oil and hot water, and baffles in said tank outside said housing to assist in settling out the water and other impurities from the oil.

2. An oil treating device comprising a treating tank, a housing thereon, a propeller in said housing, separate nozzles to simultaneously deliver oil and hot water under pressure against the blades of said propeller, agitating means driven by said propeller to further agitate said oil and means outside said housing to assist in the settling of water and other impurities from the oil.

3. An oil treating device comprising a treating tank, a housing thereon, a propeller in said housing, means to deliver oil and hot water forcibly against the blades of said propeller, means to further agitate said oil and water and discharge it from the lower end of said housing actuated by said propeller and means in the tank outside said housing to assist in the gravity separation of the oil and water.

4. An oil treating device comprising a treating tank, a housing thereon, a propeller in said housing, nozzles adapted to deliver oil and hot water forcibly against the blades of said propeller, an upright tube in said treating tank, a rotatable shaft in said tube, operative connections between the shaft of said propeller and said rotatable shaft, agitating means on said rotatable shaft shaped to drive the liquid into said tank.

5. An oil treating device comprising a treating tank, a housing thereon, a propeller in said housing, means to discharge hot water and oil forcibly against the blades of said propeller, an upright tube in said tank connected with said housing, a rotatable shaft in said tube operated by said propeller, and agitating blades on said shaft formed to drive fluid forcibly downwardly in said tube.

6. An oil treating device comprising a treating tank, a central tube therein, a rotatable shaft in said tube, means to operate said shaft and means to deliver a mixture of hot water and oil to said tube, agitating blades on said shaft, certain of said blades acting to force said mixture out the lower end of said tube, means to deflect the fluid upwardly from the lower end of said tube and means to break up and separate the water from the oil.

7. An oil treating device comprising a treating tank, a propeller on said tank, means to deliver a jet of hot water and a separate stream of oil to said propeller, a shaft operated by said propeller and means on said shaft to mix and agitate said water and oil, and draw it downwardly into said tank in the manner described and means in said tank to assist in the separation of the oil from its impurities.

In testimony whereof, I hereunto affix my signature, this the 2nd day of April, A. D. 1923.

JOHN F. WRIGHT.